United States Patent
Adams et al.

(10) Patent No.: US 7,092,605 B2
(45) Date of Patent: Aug. 15, 2006

(54) FIBER OPTIC CABLE WITH COMPOSITE POLYMERIC/METALLIC ARMOR

(75) Inventors: Scott M. Adams, Catawba, NC (US); Kevin S. Paschal, Hickory, NC (US); Jarrett S. Shinoski, Hickory, NC (US); Todd R. Travis, Huntersville, NC (US); Lee E. Wandel, Cornelius, NC (US); Robert A. Wessels, Hickory, NC (US)

(73) Assignee: Commscope Properties, LLC, Sparks, NE (US)

(*) Notice: Subject to any disclaimer, the term of this patent is extended or adjusted under 35 U.S.C. 154(b) by 135 days.

(21) Appl. No.: 10/354,373

(22) Filed: Jan. 30, 2003

(65) Prior Publication Data

US 2004/0151448 A1    Aug. 5, 2004

(51) Int. Cl.
*G02B 6/44* (2006.01)
(52) U.S. Cl. ...................................... 385/113
(58) Field of Classification Search ............... 385/113, 385/100–114
See application file for complete search history.

(56) References Cited

U.S. PATENT DOCUMENTS

| | | | |
|---|---|---|---|
| 4,723,831 A * | 2/1988 | Johnson et al. ............. 385/111 |
| 5,138,685 A | 8/1992 | Arroyo et al. | |
| 5,509,097 A * | 4/1996 | Tondi-Resta et al. ....... 385/113 |
| 5,991,485 A | 11/1999 | Kertscher et al. | |
| 6,371,691 B1 | 4/2002 | Finzel et al. | |
| 6,577,795 B1 * | 6/2003 | Tuminaro ................... 385/102 |
| 2002/0061231 A1 | 5/2002 | Finzel et al. | |
| 2004/0165957 A1 * | 8/2004 | Serrano et al. ............. 405/157 |

FOREIGN PATENT DOCUMENTS

| | | |
|---|---|---|
| EP | 0 566 328 A1 | 10/1993 |
| EP | 1 076 253 A2 | 2/2001 |
| EP | 1 443 351 A3 | 11/2004 |

OTHER PUBLICATIONS

Brochure MCS Road Cable 12-144 Fibers, Corning Cable Systems, Product Specifications, no date.
Copy of EPO Search Report for EP 04 001807, Sep. 22, 2004.

* cited by examiner

*Primary Examiner*—Javaid H. Nasri
(74) *Attorney, Agent, or Firm*—Myers Bigel Sibley & Sajovec

(57) ABSTRACT

A fiber optic cable includes: a plurality of optical fibers; a tube circumferentially surrounding the optical fibers, the tube being formed of a first polymeric material; an armor circumferentially surrounding and fixed relative to the tube, the armor being formed of a metallic material; and a jacket circumferentially surrounding the armor, the jacket being formed of a second polymeric material. In this configuration, the cable can provide the requisite mechanical, electrical, handling and connectorizing properties for use in applications such as pavement crossings.

42 Claims, 3 Drawing Sheets

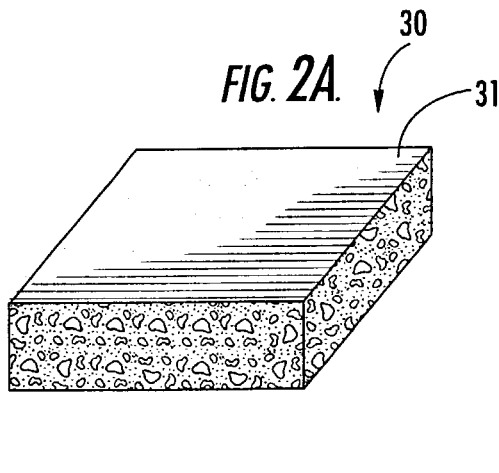
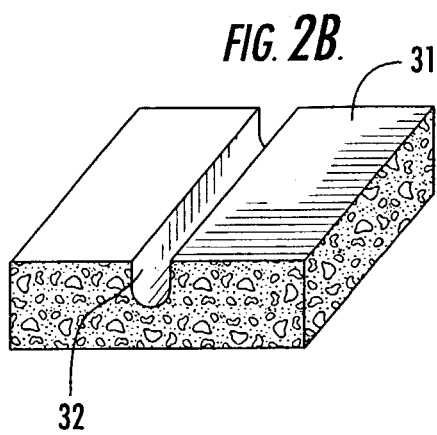
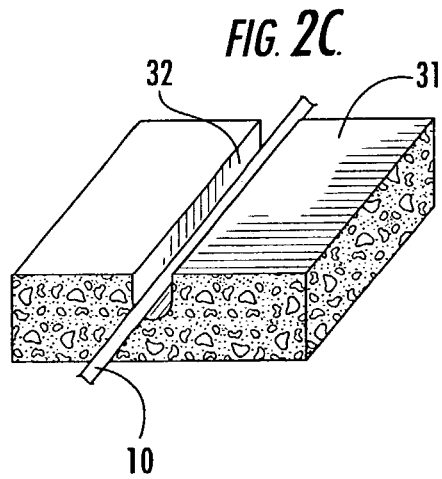
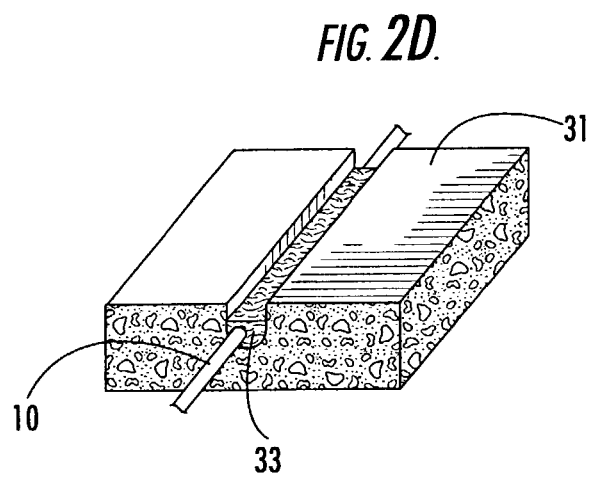
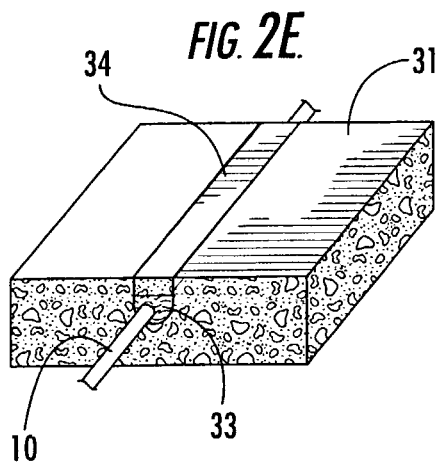

FIBER OPTIC CABLE WITH COMPOSITE POLYMERIC/METALLIC ARMOR

FIELD OF THE INVENTION

The present invention relates generally to communications cables, and more specifically to fiber optic communications cables.

BACKGROUND OF THE INVENTION

Fiber optic cables include optical fibers which transmit information in cable television, computer, power, and telephone systems. Typically, fiber optic cables include a plurality of optical fibers housed within one or more protective layers. The number of fibers included in the cable, and the materials and thicknesses thereof used to form the protective layers, are selected based on the type of application or installation of the cable.

One specialized cable application is a "pavement crossing," in which a cable is laid across an existing section of pavement, asphalt, or the like. Conventionally, a slot of about 10 mm is formed in the pavement section. Fiber optic cable is placed in the slot, a bedding material (such as Neoprene rubber) is placed over the cable, and the slot is then patched with pavement. Cables employed in this environment are subjected to potentially heavy mechanical loads, moisture, and heat. In addition, typically it is desirable that the cable be relatively easy to manipulate and to "connectorize" (i e., that it be receptive to connectors added in the field for connecting and splicing with other cables). Also, with many cables flexibility facilitates handling and installation of the cable, but the cable should not buckle when bent, as buckling can negatively impact the optical and mechanical properties of the cable.

Typical fiber optic cables employed in pavement crossings include a smooth metal tube (with a typical thickness of 0.020 inches) that protects fibers residing in the lumen of the tube from exterior elements. The metal tube is then covered with a polymeric jacket (polyethylene is an exemplary jacket material). The metal tube, typically stainless steel or copper, tends to provide adequate protection and is relatively easy to weld (thereby facilitating volume production. However, the relatively thick metal tube can also render the cable difficult to bend. Exemplary pavement crossing products include "MSC Road Cable," available from Corning Cable Systems, Hickory, N.C., and similar products available from Pirelli S.p.A, Milan, Italy.

In view of the foregoing, it would be desirable for a pavement crossing cable to have adequate mechanical, optical, protective and connectorizing properties while being easier to bend during handling.

SUMMARY OF THE INVENTION

The present invention is directed to a fiber optic cable that can meet the electrical and performance demands of pavement crossing applications while being more flexible and resistant to kinking than typical cables used in such environments. As a first aspect of the invention, a fiber optic cable comprises: a plurality of optical fibers; a tube circumferentially surrounding the optical fibers, the tube being formed of a first polymeric material; an armor circumferentially surrounding and fixed relative to the tube, the armor being formed of a metallic material; and a jacket circumferentially surrounding the armor, the jacket being formed of a second polymeric material. In this configuration, the cable can provide the requisite mechanical, electrical, handling and connectorizing properties for use in applications such as pavement crossings.

As a second aspect, the invention is directed to an fiber optic cable installation site, which comprises a fiber optic cable as described above embedded in an installation substrate, such as pavement, asphalt, cement, concrete or soil.

As a third aspect of the invention, a fiber optic cable can be manufactured by a method comprising the steps of: providing a plurality of optical fibers residing in a tube formed of a first polymeric material; forming a metallic armor to circumferentially surround and be fixed relative to the tube; and forming a jacket of a second polymeric material to circumferentially surround the armor. In some embodiments, the armor is formed by bending a thin metallic strip around the tube and welding a longitudinally-disposed seam formed by lateral edges of the strip.

As a fourth aspect of the invention, a fiber optic cable as described above can be installed at a field site by a method comprising the steps of: forming an elongate slot in an installation substrate such as those set forth above; positioning a fiber optic cable as described above in the installation substrate; and covering the slot and fiber optic cable with additional installation substrate material to embed the fiber optic cable therein.

BRIEF DESCRIPTION OF THE FIGURES

FIGS. 2A through 2E are sequential cutaway perspective views illustrating the installation of a fiber optic cable according to the present invention in an installation substrate.

DETAILED DESCRIPTION OF EMBODIMENTS OF THE INVENTION

Figure 1:
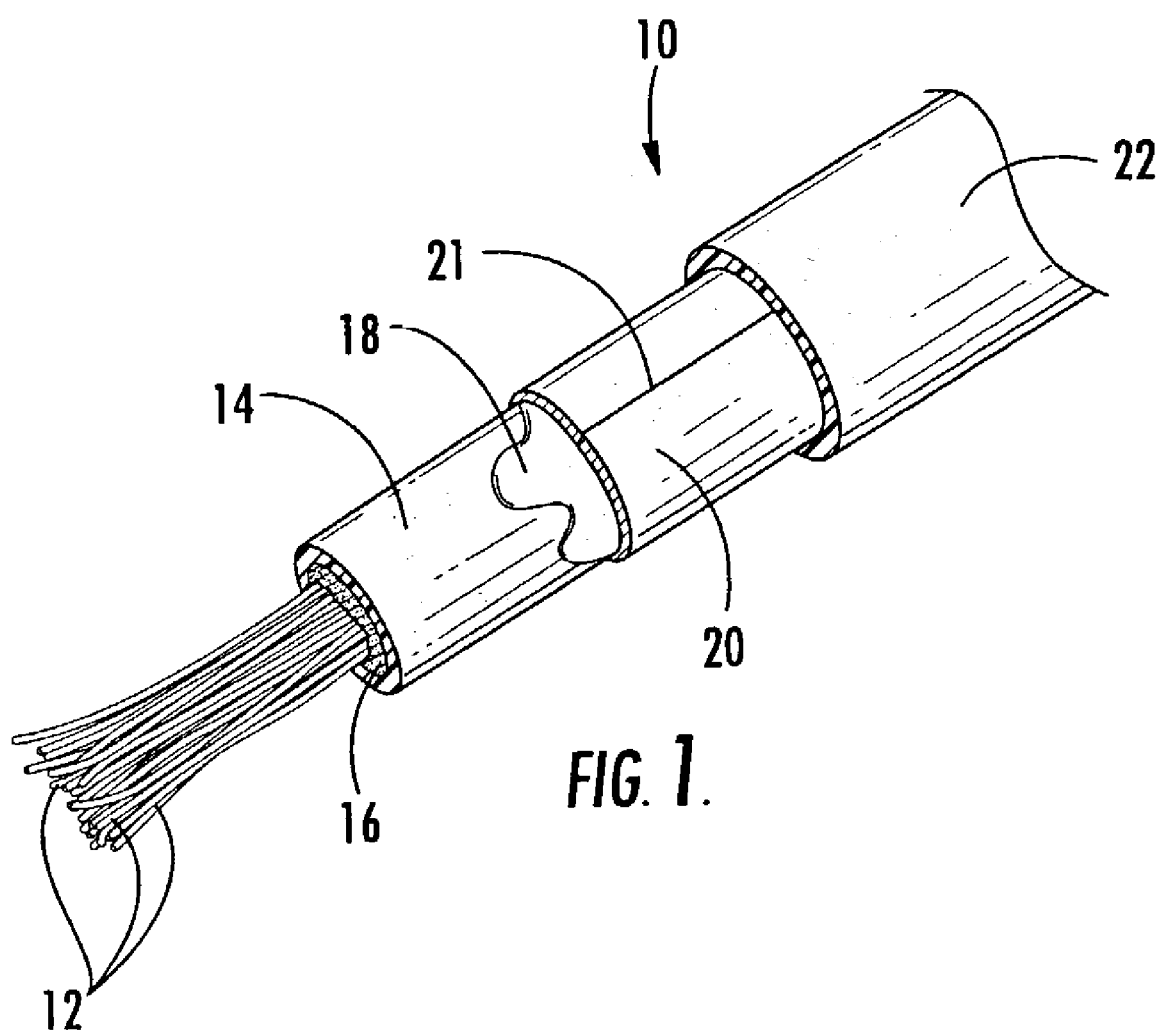
FIG. 1 is a partially cutaway perspective view of an embodiment of a fiber optic cable of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Referring now to the drawings, a fiber optic cable, designated broadly at 10, is shown in FIG. 1. The cable 10 includes a plurality of optical fibers 12, an elongate polymeric tube 14 that contains the optical fibers 12, a metallic armor 20 that circumferentially surrounds the tube 14, and an outer jacket 22 that circumferentially surrounds the armor 20. These components are discussed in greater detail below.

The optical fibers 12 are long, slender strands that are capable of carrying and propagating an optical signal. More particularly, optical fibers serve as a medium for transmitting light by virtue of a phenomenon known as total internal reflection. Optical fibers typically have a glass or, on occasion, plastic core that is enveloped by an outer concentric shell or cladding. The cladding is generally made from glass and has a relatively low index of refraction with respect to the core. Because of the difference in the index of refraction between the two materials, light rays striking the cladding at an angle greater than or equal to a critical angle ($\phi_c$) will be reflected back into the core at an angle of reflection equal to the angle of incidence. Inasmuch as the angles of incidence and reflection are equal, the light ray will continue to zig-zag down the length of the fiber. If a light ray strikes the cladding at an angle less than the critical angle, however, the ray will be refracted and pass through the cladding, thus escaping the fiber.

Those skilled in this art will recognize that any number of optical fiber constructions may be suitable for use with the present invention. In particular, optical fibers having a thickness between about 200 and 300 microns are preferred. Exemplary optical fibers are "LightScope" ZWP Single Mode or "LaserCore" multimode optical fibers, available from CommScope Inc., Hickory N.C.

Still referring to FIG. 1, the tube 14 is formed of a polymeric material, preferably one comprising polypropylene (PP), polybutyl terephthalate (PBT), polyethylene (PE) and mixtures and co-polymers thereof. In some embodiments, the polymeric material will include additives and/or fillers that can enhance or modify physical properties and/or facilitate manufacturing. The materials and dimensions of the tube 14 may be selected to provide sufficient rigidity to protect the optical fibers 12 from external loads and sufficiently flexible to avoid buckling under bending loads and to enable the cable 10 to be bent as needed for installation. A material having a flexural modulus of between about 200,000 and 500,000 psi and a flexural strength of between about 8,000 and 16,000 psi is particularly suitable. An exemplary polymeric material for the tube 14 is Valox PBT, available from GE Plastics, New York City, N.Y. Typically, a tube 14 formed of PBT can have an outer diameter of between about 1.8 and 9 mm and a wall thickness of between about 0.4 and 1.0 mm.

In some embodiments, the cable 10 may include a filling gel 16 within the lumen of the tube 14. The gel 16 can have water-blocking properties and can reduce the degree of movement of optical fibers 12 within the tube lumen. An exemplary filling gel is one comprising a blend of oil and fumed silica; such a gel is available from Master Adhesives, (Norcross, Ga.). In other embodiments, other water-blocking materials, such as dry powders or threads, may be employed in lieu of a filling gel. An exemplary dry powder is disclosed in U.S. Pat. No. 6,326,551 to Adams.

Referring again to FIG. 1, the armor 20 is formed of a metallic material; exemplary metals include stainless steel, copper and aluminum, with copper being preferred for some embodiments. The armor 20 may be formed of a thin, flat metallic strip (i.e., one that is between about 0.008 in. (0.2 mm) and 0.020 in. (0.5 mm) in thickness) that is bent around the tube 14 into an elongate cylinder that circumferentially surrounds the tube 14; in such an instance, opposing lateral edges of the strip can be formed into a seam 21 via welding (typically RF or TIG welding) or another joining technique. The armor 20 typically has an outer diameter of between about 0.230 (3.8 mm) and 0.350 (8.9 mm) inches.

In some embodiments, the armor 20 is fixed to the outer surface of the tube 14 via adhesive bonding. In such embodiments, an adhesive layer 18 is positioned between the tube 14 and the armor 20. Exemplary adhesives for forming an adhesive bond include ethylene acrylic acid (EAA), ethylene methylacrylate (EMA) and mixtures and formulations thereof.

In some other embodiments a layer of hot melt adhesive containing superabsorbant polymer powders is applied as the adhesive layer 18, between the armor 20 and the outer surface of the tube 14, to prevent the migration of water into and along this interstice. It is also possible to use only a layer of superabsorbant polymer powders between the tube 14 and the armor 20 to block water migration.

Also, in some embodiments, the armor 20 is swaged onto the outer surface of the tube 14. In the swaging process, a tubular blank of armoring material (which may have been formed from a thin, flat metallic strip as described above) is provided in a length somewhat shorter than the length of cable desired. Significant tension is applied to the blank in its axial direction to cause it to lengthen; as the blank lengthens, its diameter shrinks, such that the resulting armor 20 fits snugly onto (and, in some embodiments, slightly compresses via an interference fit) the tube 14. Swaging may be performed whether or not an adhesive layer 18 is present between the tube 14 and the armor 20.

Referring again to FIG. 1, the jacket 22 is formed of a polymeric material. Exemplary polymeric materials include polyvinylidene fluoride (PVDF), polyethylene (PE), polyvinylchloride (PVC), and copolymers and blends thereof; a medium density polyethylene material (MDPE) is preferred in some embodiments. The material for the jacket 22 should be capable of protecting the internal components from external elements (such as water, dirt, dust and fire) and from physical abuse. The material of the jacket 22 may include additives, such as PTFE or carbon black, which can enhance physical properties or facilitate manufacturing. Ordinarily, the jacket 22 has a thickness of between about 0.020 and 0.070 inches. In some embodiments, the jacket 22 is bonded to the armor 20 with an adhesive (not shown); exemplary adhesives are as described above.

When a cable 10 is constructed as described, it can have desirable performance properties. An exemplary cable can be constructed as set forth in Table 1.

TABLE 1

| Fiber | Material | |
|---|---|---|
| | Size | 250 micron |
| Tube | Material | PBT |
| | Outer Diameter | 7.2 mm |
| | Wall Thickness | .80 mm |
| Armor | Material | Copper |
| | Outer Diameter | 7.7 mm |
| | Wall Thickness | .25 mm |
| Jacket | Material | MDPE |
| | Outer Diameter | 8.8 mm |
| | Wall Thickness | .55 mm |

This cable 10 can include a layer of EAA adhesive between the tube 14 and armor 20, and the armor 20 can be swaged onto the tube 14. The cable 10 constructed as in Table 1 can have the physical properties set forth in Table 2.

TABLE 2

| | | | Minimum Bend Radius (in.) | | Max. Tensile Load | | Maximum |
|---|---|---|---|---|---|---|---|
| Fiber Count | Outer Diameter (in.) | Weight (lb/kft) | Loaded | Unloaded | Short Term | Long Term | Vertical Rise (ft) |
| 72 | 0.39 | 60 | 15.5 | 7.8 | 225 | 75 | 1260 |

Also, the cable 10 as constructed in Table 1 can meet the mechanical and environmental specifications set forth in Table 3.

TABLE 3

| Property | Specification | Test Method |
| --- | --- | --- |
| Operating Temperature | −40° C. to +70° C. | FOTP-3 |
| Installation Temperature | −30° C. to +60° C. | N/A |
| Storage Temperature | −40° C. to +75° C. | N/A |
| Crush Resistance | 44 N/mm | FOTP-41 |
| Impact Resistance | Exceeds | FOTP-25 |
| Flexing | Exceeds | FOTP-104 |
| Twist Bend | Exceeds | FOTP-85 |

The mechanical and environmental specifications of the cable of the present invention can enable the cable 10 to be employed in some applications, particularly pavement crossings. The cable 10 can have the requisite mechanical and environmental performance to protect the optical fibers 12 adequately while being more flexible than prior art pavement crossing fiber optic cables. Also, in a splicing operation, the armor 20 can be peeled from the tube 14, which enables the tube 14 to be used as a furcation device in a splice enclosure.

The cable 10 may be particularly suited for use in pavement, asphalt, concrete, cement, soil, or other solid substrates. An exemplary installation site 30 is illustrated in FIGS. 2A through 2E. During installation of a cable 10 in an installation substrate 31 (FIG. 2A), a slot 32 is formed in the installation substrate 31 (FIG. 2B). The slot 32 is typically between about 8 to 12 mm wide; in any event, the slot 32 should be sufficiently wide to receive the cable 10 completely. Once the cable 10 is placed in the slot 32 (FIG. 2C), a bedding material 33 (such as neoprene rubber) is placed over the cable 10 (FIG. 2D), and a cap 34 of installation substrate material is installed over the slot 32 (FIG. 2E) to level the surface of the installation substrate 31 and to protect the cable 10. Once the cap 34 hardens, the installation site 30 is available for use as before. Typical cable lengths for pavement crossing applications are between about 50 and 1000 feet.

Figure 3:
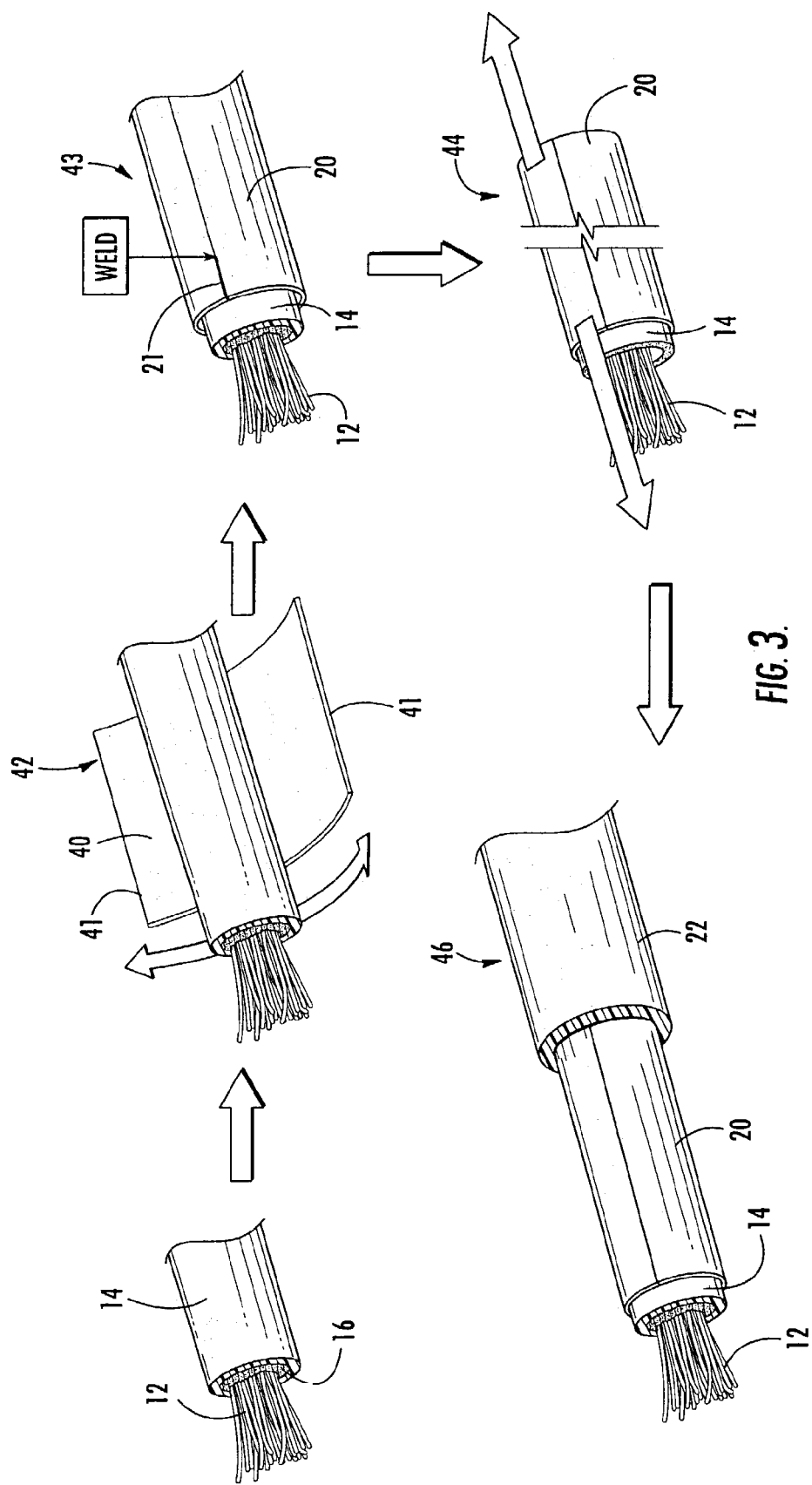
FIG. 3 is a schematic diagram of a manufacturing method according to the present invention.

Referring now to FIG. 3, the cable 10 may be manufactured by the method illustrated therein. A tube 14 with optical fibers 12 and filling gel 16 positioned in its lumen is presented to a flat, thin metallic strip 40 at a bending station 42. The strip 40 is bent to circumferentially surround the tube 14, thereby forming the armor 20. The lateral edges 41 of the strip 40 meet after bending and are welded at the seam 21 at a welding station 43. The tube/armor assembly is transferred to a swaging station 44, where the armor 20 is swaged to cause it to compress onto the tube 14. The swaged armor 20 and tube 14 are then transferred to an extruder 46, where the jacket 22 is extruded onto the armor to form the cable 10. This process, particularly with the employment of a polymeric tube and a thin, flat metal strip that can be bent and seam-welded into place, can provide productivity advantages over production methods for prior fiber optic cables used in pavement crossings that have much thicker metal armor layers. This is due to the higher welding speeds possible with the thinner metal and the capability to make long, continues lengths of cable.

Those skilled in this art will recognize that the steps set forth above can be carried out at separate stations, as part of a single continuous manufacturing line, or some combination of each. Also, the cable 10 may also be produced by other techniques known to and/or recognized by those skilled in this art as being suitable for fiber optic cable manufacture. Moreover, although the cable is particularly suitable for pavement crossings, it may also be employed in other applications.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

That which is claimed is:

1. A fiber optic cable, comprising:
    a plurality of optical fibers;
    a tube circumferentially surrounding the optical fibers, the tube being formed of a first polymeric material;
    an armor circumferentially surrounding and fixed relative to the tube to form a composite structure, the armor being formed of a metallic material, wherein the armor includes a longitudinally-disposed welded seam; and
    a jacket circumferentially surrounding the armor, the jacket being formed of a second polymeric material.

2. The fiber optic cable defined in claim 1, wherein the first polymeric material comprises a material selected from the group consisting of: polypropylene, polyethylene and polybutyl terephthalate.

3. The fiber optic cable defined in claim 1, further comprising a water-blocking material within the tube interspersed with the plurality of optical fibers.

4. The fiber optic cable defined in claim 3, wherein the water-blocking material is a filling gel.

5. The fiber optic cable defined in claim 3, wherein the water-blocking material is a dry powder.

6. The fiber optic cable defined in claim 1, wherein the armor is formed of a metallic material selected from the group consisting of: stainless steel; copper; and aluminum.

7. The fiber optic cable defined in claim 1, wherein the armor is formed of copper.

8. The fiber optic cable defined in claim 1, wherein the armor has a thickness of between about 0.008 and 0.020 inches.

9. The fiber optic cable defined in claim 8, wherein the armor has an outer diameter of between about 0.230 and 0.350 inches.

10. The fiber optic cable defined in claim 1, further comprising a layer of superabsorbant polymer powder between the tube and the armor.

11. The fiber optic cable defined in claim 10 wherein the superabsorbant powder is applied in a hot melt matrix material.

12. The fiber optic cable defined in claim 1, wherein the armor is fixed to the tube via an interference fit.

13. The fiber optic cable defined in claim 1, wherein the second polymeric material comprises medium density polyethylene.

14. The fiber optic cable defined in claim 1, wherein the cable has a length of between about 50 and 1,000 feet.

15. A method of installing a fiber optic cable at a field site, comprising the steps of:
    forming an elongate slot in an installation substrate;
    positioning a fiber optic cable of claim 1 in the installation substrate; and covering the slot and fiber optic cable with additional installation substrate material to embed the fiber optic cable therein.

16. The method defined in claim 15, wherein the installation substrate comprises a material selected from the group consisting of: pavement; asphalt; cement; concrete; and soil.

17. The fiber optic cable defined in claim 1, wherein the armor has a thickness of between about 0.008 inch and 0.020 inch.

18. The fiber optic cable defined in claim 17, wherein the armor has an outer diameter of between about 0.23 inch and 0.35 inch.

19. The fiber optic cable defined in claim 17, wherein the jacket has a thickness of between about 0.020 and 0.070 inch.

20. An fiber optic cable installation site, comprising:
an installation substrate; and
a fiber optic cable embedded in the installation substrate, the fiber optic cable comprising:
a plurality of optical fibers;
a tube circumferentially surrounding the optical fibers, the tube being formed of a first polymeric material;
an armor circumferentially surrounding and fixed relative to the tube to form a composite structure, the armor being formed of a metallic material; and
a jacket circumferentially surrounding the armor, the jacket being formed of a second polymeric material;
wherein the installation substrate includes a cap that is exposed to the atmosphere, and wherein the cap comprises a material selected from the group consisting of: pavement; asphalt; cement; and concrete.

21. The fiber optic cable installation site defined in claim 20, wherein the installation substrate comprises a material selected from the group consisting of: pavement; asphalt; cement; concrete; and soil.

22. The fiber optic cable installation site defined in claim 20, wherein the first polymeric material comprises a material selected from the group consisting of: polypropylene, polyethylene and polybutyl terephthalate.

23. The fiber optic cable installation site defined in claim 20, wherein further comprising a water-blocking material within the tube interspersed with the plurality of optical fibers.

24. The fiber optic cable installation site defined in claim 23, wherein the water-blocking material is a filling gel.

25. The fiber optic cable installation site defined in claim 23, wherein the water-blocking material is a dry powder.

26. The fiber optic cable installation site defined in claim 20, wherein the armor is formed of a metallic material selected from the group consisting of: stainless steel; copper; and aluminum.

27. The fiber optic cable installation site defined in claim 20, wherein the armor is formed of copper.

28. The fiber optic cable installation site defined in claim 20, wherein the armor includes a longitudinally-disposed welded seam.

29. The fiber optic cable installation site defined in claim 20, wherein the armor has a thickness of between about 0.008 and 0.020 inches.

30. The fiber optic cable installation site defined in claim 29, wherein the armor has an outer diameter of between about 0.230 and 0.350 inches.

31. The fiber optic cable installation site defined in claim 20, further comprising an adhesive layer between the tube and the armor to fix the tube relative to the armor.

32. The fiber optic cable installation site defined in claim 31, wherein the adhesive layer comprises ethylene acrylic acid.

33. The fiber optic cable installation site defined in claim 20, wherein the armor is fixed to the tube via an interference fit.

34. The fiber optic cable installation site defined in claim 20, wherein the second polymeric material that forms the jacket comprises medium density polyethylene.

35. The fiber optic cable installation site defined in claim 20, wherein the cable has a length of between about 50 and 1,000 ft.

36. A method of manufacturing a fiber optic cable, comprising the steps of:
providing a plurality of optical fibers residing in a tube formed of a first polymeric material;
forming a metallic armor to circumferentially surround and be fixed relative to the tube such that the tube and armor form a composite structure, wherein the step of forming a metallic armor comprises bending a thin metallic strip around the tube;
welding a longitudinally-disposed seam formed by lateral edges of the thin metallic strip; and forming a jacket of a second polymeric material to circumferentially surround the armor.

37. The method defined in claim 36, wherein the first polymeric material is selected from the group consisting of: polypropylene, polyethylene and polybutyl terephthalate.

38. The method defined in claim 36, wherein the thin metallic strip has a thickness of between about 0.008 and 0.020 inches.

39. The method defined in claim 36, further comprising the step of swaging the metallic armor to cause it shrink in diameter.

40. The method defined in claim 39, wherein the step of forming a polymeric jacket comprises extruding the second polymeric material around the armor.

41. The method defined in claim 36, wherein the tube includes an adhesive layer that adheres to the armor.

42. A fiber optic cable, comprising:
a plurality of optical fibers;
a tube circumferentially surrounding the optical fibers, the tube being formed of a first polymeric material;
an armor circumferentially surrounding and fixed relative to the tube to form a composite structure, the armor being formed of a metallic material, wherein the armor includes a longitudinally-disposed welded seam; and
a jacket circumferentially surrounding the armor, the jacket being formed of a second polymeric material;
the fiber optic cable further comprising an adhesive layer between the tube and the armor to fix the tube relative to the armor.

* * * * *